US006451275B1

(12) United States Patent
Fleming

(10) Patent No.: US 6,451,275 B1
(45) Date of Patent: Sep. 17, 2002

(54) METHODS FOR REDUCING CYANIDE CONSUMPTION IN PRECIOUS METAL RECOVERY BY REDUCING THE CONTENT OF INTERMEDIATE SULFUR OXIDATION PRODUCTS THEREIN

(75) Inventor: Christopher A. Fleming, Peterborough (CA)

(73) Assignee: Lakefield Research Limited, Ontario (CA)

( * ) Notice: Subject to any disclaimer, the term of this patent is extended or adjusted under 35 U.S.C. 154(b) by 0 days.

(21) Appl. No.: 09/613,250

(22) Filed: Jul. 10, 2000

Related U.S. Application Data

(60) Provisional application No. 60/188,196, filed on Mar. 10, 2000.

(51) Int. Cl.[7] .............................. C22B 1/00; C22B 3/00; C22B 11/00
(52) U.S. Cl. .............................. 423/47; 423/22; 423/29
(58) Field of Search ................ 423/47, 29, 22

(56) References Cited

U.S. PATENT DOCUMENTS

| 2,209,331 A | * | 7/1940 | Haglund ...................... 423/47 |
| 2,650,159 A | * | 8/1953 | Tarr, Jr. ........................ 423/47 |
| 2,878,102 A | * | 3/1959 | Sternfels ...................... 423/47 |
| 3,791,812 A | * | 2/1974 | Frank et al. .................. 423/47 |
| 4,561,947 A | * | 12/1985 | Schulze ....................... 423/27 |
| 5,147,618 A | * | 9/1992 | Touro et al. |
| 5,783,158 A | * | 7/1998 | Tacke et al. .................. 423/47 |

* cited by examiner

*Primary Examiner*—Steven Bos
(74) *Attorney, Agent, or Firm*—Thomas A. O'Rourke; Wyatt Gerber & O'Rourke

(57) ABSTRACT

Briefly stated, there is provided a method for reducing cyanide consumption in precious metals mining extraction processes involving a sulfur bearing ore body, comprising the steps of providing a precious metal bearing material having intermediate sulfur oxidation products, and exposing the material to sulfur dioxide gas, bisulfite ions or sulfite ions, in a manner to cause at least a portion of the intermediate sulfur oxidation products to be rendered unreactive with cyanide.

29 Claims, 3 Drawing Sheets

METHODS FOR REDUCING CYANIDE CONSUMPTION IN PRECIOUS METAL RECOVERY BY REDUCING THE CONTENT OF INTERMEDIATE SULFUR OXIDATION PRODUCTS THEREIN

REFERENCE TO CO-PENDING APPLICATION

The subject matter of U.S. provisional application Ser. No. 60/188,196 filed Mar. 10, 2000 and entitled METHODS FOR REDUCING CYANIDE CONSUMPTION is incorporated herein by reference.

BACKGROUND OF THE INVENTION

1. Field of the Invention

The present invention relates to ore processing and more particularly to methods for reducing consumption of cyanide.

2. Description of the Related Art

The mining industry has for many years utilized cyanide as an agent to extract gold from ore. Environmental concerns, however, have made the use of cyanide relatively expensive, particularly in view of the controls necessary to prevent rogue emissions of cyanide into the environment. As a consequence, extensive efforts have been carried out, in some cases to control the emissions of cyanide, and in others to find feasible alternatives to cyanide. However, cyanide remains a dominant reagent in the extraction of gold, especially in those ores in which the gold is relatively difficult to extract using other methods.

A recent development in mining extraction techniques is known by the trademark BIOX®, which is carried out on refractory ores or concentrates prior to cyanidation. A refractory gold ore is one that does not respond well to the cyanidation technique. One of the reasons for refractoriness is that the gold particles are encapsulated in an inert matrix, such as a sulfide mineral, which is impervious to the cyanide leach solution. The BIOX® process makes use of bacteria which oxidize certain portions of an ore sample, such as sulfide minerals, in order to make gold, or other precious elements, more accessible to reagents such as cyanide.

In one application, the BIOX® bacteria oxidize a sulfide-bearing ore or concentrate, and as a consequence the process converts a significant proportion of the sulfide therein from the sulfide form to a stable sulfate form. Conveniently, the resulting sulfate form is unreactive to cyanide. However, during the bacterial oxidation process, a measurable percentage of elemental sulfur is usually formed as well as other intermediate sulfur bearing species, and these species are reactive to cyanide. Therefore, when the BIOX® pretreated material is passed through the cyanidation process, there tends to be a significantly higher consumption of cyanide than is necessary simply to extract the gold or other precious metals from the ore sample. Another recent bacterial leaching development in mining extraction techniques is known as the BACTECH process, which is also carried out on refractory ores or concentrates prior to cyanidation, with the same objective as the BIOX® process.

Other pretreatment processes that have been developed to oxidize refractory gold ores and make them amenable to cyanidation, and which are also known to produce elemental sulfur and other intermediate sulfur compounds that are reactive in cyanide solution, are the mild pressure leaching processes that are known by the trademarks ACTIVOX and CESL, as well as the high temperature, atmospheric pressure leaching processes, which use ferric ions or cupric ions for the oxidant.

Thus, although the BIOX® process and the alternative pretreatment processes have given significant benefits to the mining industry, it would nonetheless be desirable to reduce the consumption of cyanide in the processes following them.

It is an object of the present invention to provide a novel processing technique.

It is a further object of the present invention to provide a processing technique to reduce cyanide consumption in mineral processing operations.

It is a further object of the present invention to provide a processing technique to reduce thiocyanate formation in precious metals processing operations.

SUMMARY OF THE INVENTION

Briefly stated, the invention involves a method for reducing cyanide consumption in precious metals mining extraction processes involving a sulfur bearing ore body, comprising the steps of:

providing a precious metal bearing material having intermediate sulfur oxidation products, and exposing the material to a solution containing sulfite ions, bisulfite ions or sulfur dioxide in a manner to cause at least a portion of the intermediate sulfur oxidation products to be converted to species that are either unreactive with cyanide or are soluble and can be washed from the precious metal bearing material.

In another aspect of the present invention, there is provided a precious metal bearing material from a precious metals mining extraction process, comprising intermediate sulfur oxidation products, most of which are unreactive with cyanide.

In another aspect of the present invention, there is provided a method for recovering precious metals from a sulfur-bearing ore body, comprising the steps of:

providing a precious metal-bearing material containing intermediate sulfur oxidation products;

exposing said material to either sulfur dioxide gas or sulfite ions or bisulfite ions, with or without added air or oxygen gas, in a manner to cause at least a portion of said intermediate sulfur oxidation products to be rendered unreactive with cyanide; and reacting said material with cyanide to recover precious metal from said material.

In still another aspect of the present invention, there is provided a method for recovering precious metals from a sulfur-bearing ore body, comprising the steps of:

providing a precious metal-bearing material containing intermediate sulfur oxidation products;

exposing said material to either sulfur dioxide gas or sulfite ions or bisulfite ions, with or without added air or oxygen gas, in a manner to cause at least a portion of said intermediate sulfur oxidation products to be rendered unreactive with cyanide; and thereafter;

reacting said material with cyanide to recover precious metal from said material.

In still another aspect of the present invention, there is provided a method for recovering precious metals from a sulfur-bearing ore body, comprising the steps of:

providing a precious metal-bearing material containing intermediate sulfur oxidation products;

exposing said material to either sulfur dioxide gas or sulfite ions or bisulfite ions, with or without added air or oxygen gas, and reacting said material with cyanide to recover precious metal from said material, wherein the exposing step is conducted under conditions sufficient to reduce the content of intermediate sulfur oxidation products which are reactive to cyanide, thereby reducing the consumption of cyanide in the reacting step.

BRIEF DESCRIPTION OF THE DRAWINGS

Several preferred embodiments of the present invention will be provided, by way of example only, with reference to the appended drawings, wherein.

DESCRIPTION OF THE PREFERRED EMBODIMENTS

As will be described below, the present invention is based on the discovery that sulfur dioxide gas, bisulfite ions and sulfite ions have the effect of either passivating or rendering the unreacted intermediate sulfur oxidation products unreactive to cyanide, possibly by oxidizing them to soluble species which themselves are either unreactive to cyanide, such as thiosulfate or sulfate ions, or to species that can be washed from the metal bearing material prior to cyanidation.

The term 'intermediate sulfur oxidation products' refers to elemental sulfur and other sulfur compounds with oxidation states between the minus 2 state of the sulfide ion and the plus 6 state of the sulfate ion, such as polysulfide, thiosulfate, trithionate and tetrathionate compounds.

At least one of the beneficial reactions that is believed to occur is the oxidation of elemental sulfur to soluble species that are either inert in cyanide solution or can be separated from the gold-bearing solids prior to cyanidation. Under alkaline conditions (pH>7) sulfur dioxide dissolves in solutions as sulfite ions, and the predominant oxidation reaction is believed to be oxidation of elemental sulfur to thiosulfate ions

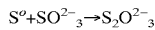

$$S^o + SO^{2-}_3 \rightarrow S_2O^{2-}_3$$

Since thiosulfate is quite inert in cyanide solution, it is not necessary to separate and discard the solution phase prior to cyanidation.

Under acidic conditions, sulfur dioxide dissolves in solution as bisulfite ions (~pH 2–7) or remains in solution as a dissolved gas (pH<2), and the predominant oxidation reaction is believed to be oxidation of elemental sulfur to tetrathionate and trithionate ions

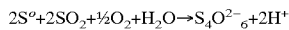
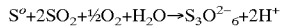

$$2S^o + 2SO_2 + \tfrac{1}{2}O_2 + H_2O \rightarrow S_4O^{2-}_6 + 2H^+$$

$$S^o + 2SO_2 + \tfrac{1}{2}O_2 + H_2O \rightarrow S_3O^{2-}_6 + 2H^+$$

Since tetrathionate and trithionate react readily with cyanide to produce thiocyanate, the solution phase containing these anions must be separated and discarded prior to cyanidation.

It is believed that this technique can be applied to many extraction processes that have been developed for the mining industry including the BIOX® and other bacterial leaching processes, the mild pressure leaching processes ACTIVOX and CESL, and the ferric and cupric leaching processes which, as is known, expose an iron and sulfur bearing ore or concentrate sample in such a manner that cyanide can penetrate the mineral particle and react with gold therein.

Figure 1:
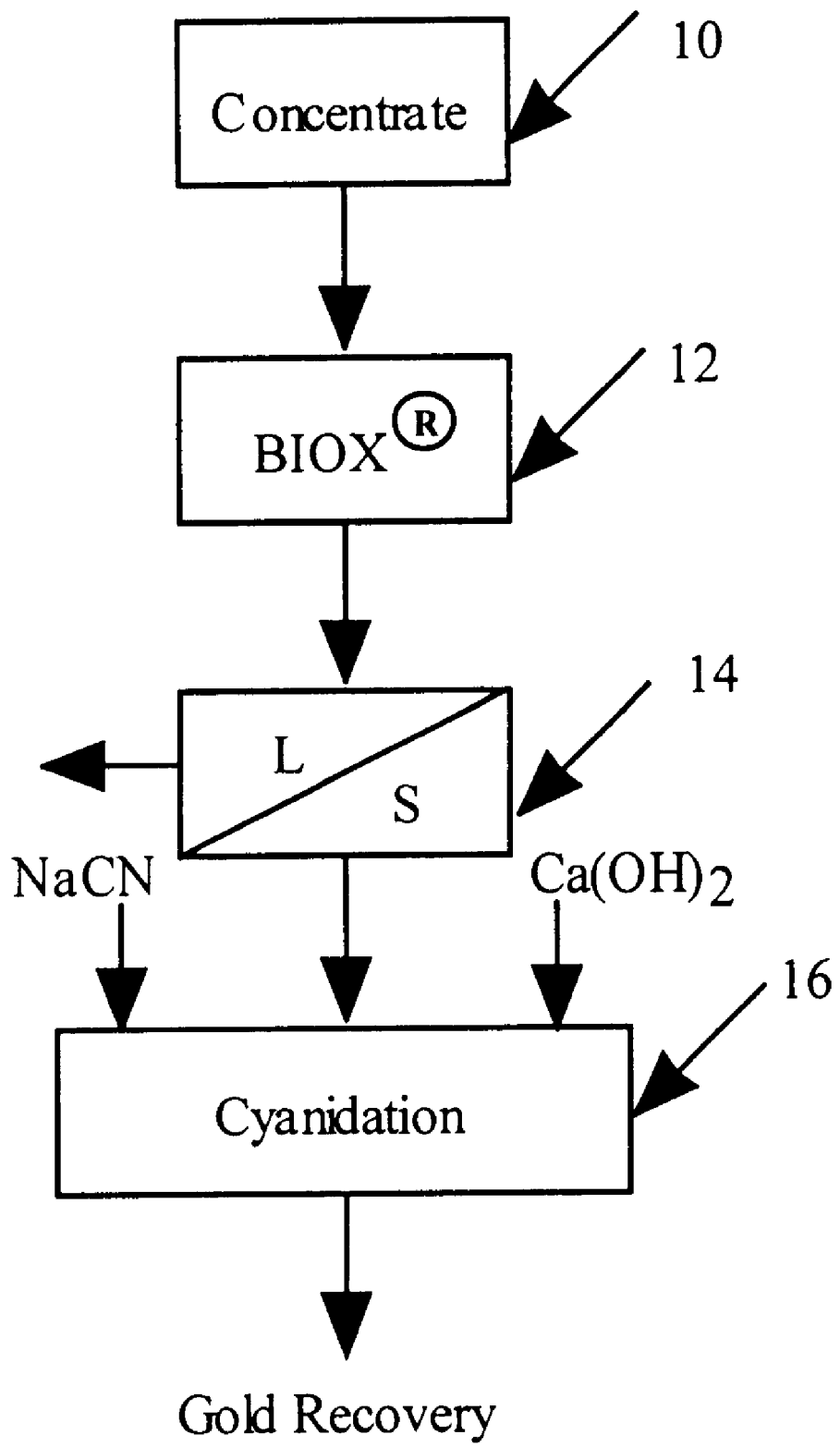
FIG. 1 is a schematic view of a conventional ore processing technique.

FIG. 1 illustrates a conventional ore processing technique, whereby a gold-containing concentrate containing sulfide minerals such as pyrite and arsenopyrite is obtained from a conventional pretreatment process step, such as flotation, as shown at 10, which is then fed into a BIOX® process step shown in 12, in turn yielding a liquid phase and a solid phase, the liquid phase containing dissolved products of the oxidized refractory minerals such a sulfuric acid and ferric sulfate and the solid phase including the gold-bearing ore or concentrate in a relatively more exposed form as a result of the BIOX® process step. The liquid phase is thus separated from the solid phase, neutralized and discarded, while the solid phase is directed to an alkaline cyanidation step as shown at 16, with the gold being recovered therefrom in the conventional manner.

In this case, the solid phase being directed to the alkaline cyanidation step typically contains a significant percentage of insoluble intermediate sulfur oxidation products, causing a correspondingly high quantity of cyanide lost through reaction therewith, such as in the order of 10 to 50 kg/t NaCN.

Figure 2:
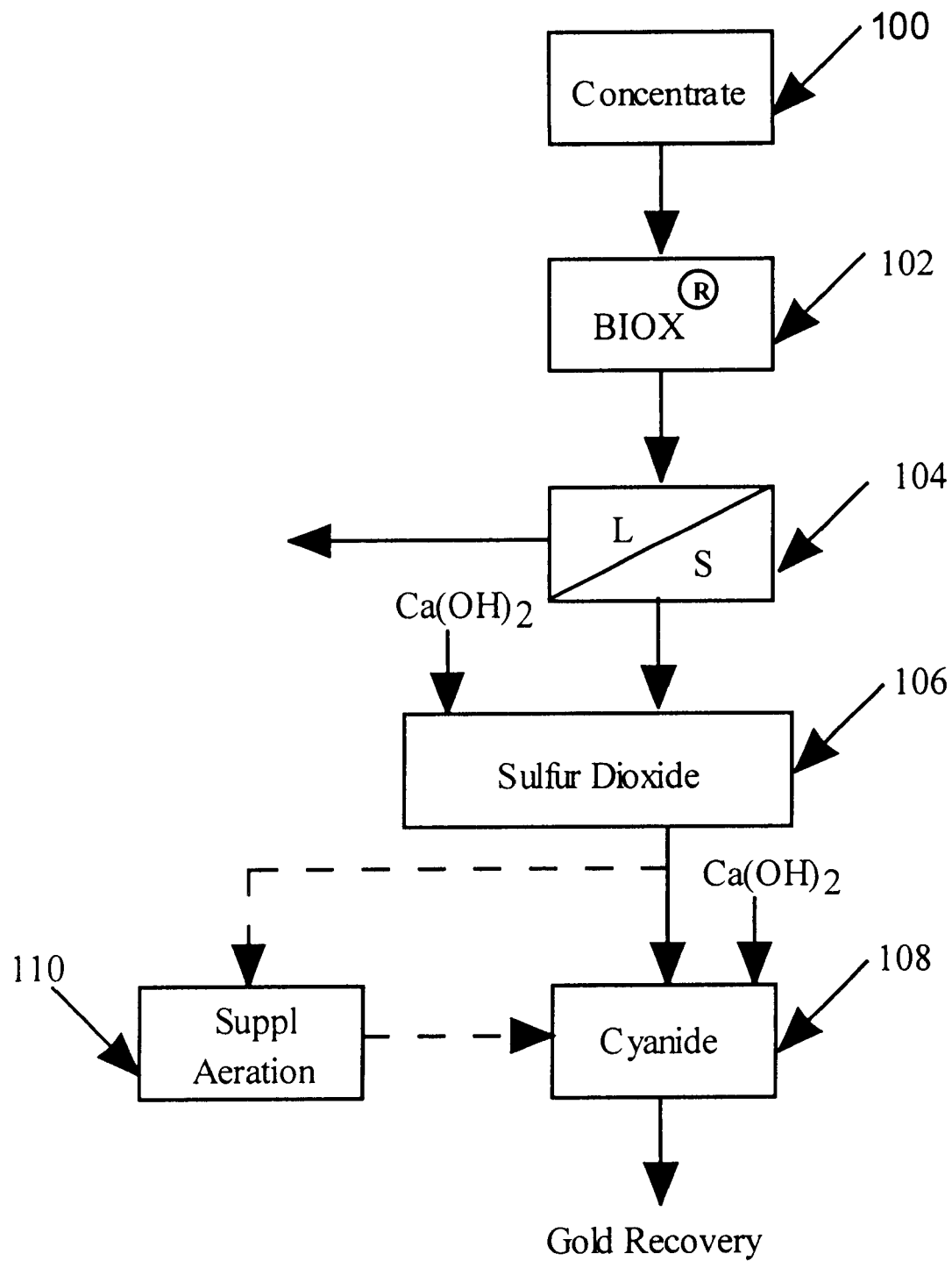
FIG. 2 is a schematic view of an ore processing technique according to the present invention.

FIG. 2 illustrates an ore processing technique according to the present invention, wherein the same gold-containing concentrate 100 is directed to the BIOX® process step 102. The liquid phase of the output 104 is separated from the solid phase, neutralized and discarded while the solid phase is directed to a sulfur oxidation or passivation process step shown at 106, in which the solid phase is exposed to a sulfur oxidation or passivation reaction. Here, the concentrate is exposed to a solution containing sulfite ions, bisulfite ions or sulfur dioxide to cause at least a portion of the intermediate sulfur oxidation products to be passivated or oxidized to ions that are unreactive with cyanide.

The output materials from process step 106 are then directed to the alkaline cyanidation step as shown at 108, with the gold being recovered therefore in the conventional manner.

Figure 3:
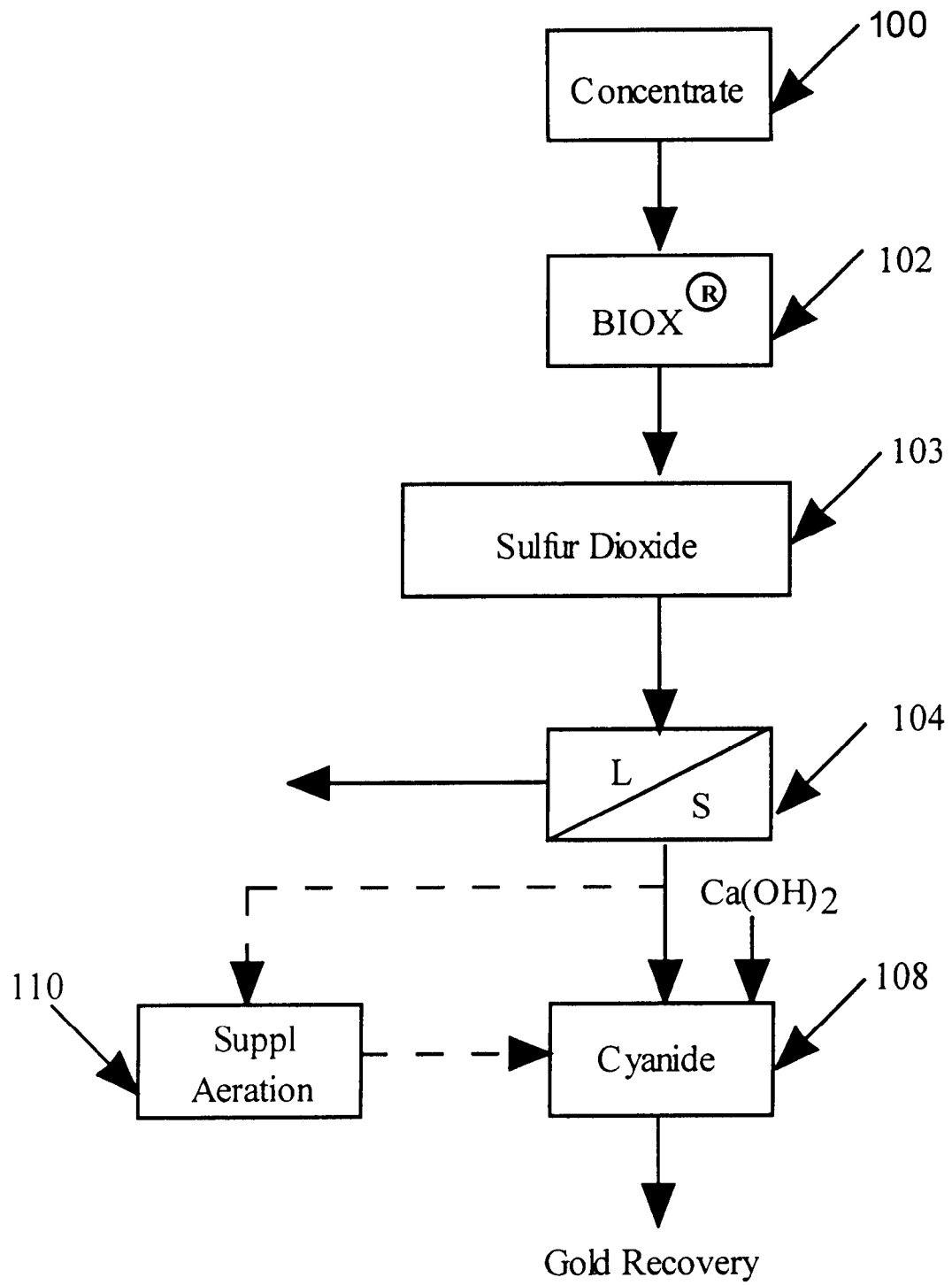
FIG. 3 is an alternative schematic view of an ore processing technique according to the present invention.

In some cases, it may be beneficial to separate and discard the liquid phase from process step 106 prior to the cyanidation step. In these situations, as illustrated in FIG. 3, the process of this invention could be carried out immediately after process step 102 and before process step 104, so that soluble products that are reactive with cyanide can be separated from the gold bearing feed material in process step 104 prior to the cyanidation step 108.

As will be explained, the intermediate sulfur oxidation products in the solid phase entering the sulfur oxidation or passivation step are altered by this treatment, causing a reduced quantity of cyanide lost through reaction therewith. For example, testing has shown that reductions from 20 to 80 percent in the amount of cyanide consumed by the gold bearing feed material are possible using the present process, leading to significant economic and environmental benefits.

Referring more particularly to the sulfur oxidation or passivation step 106 or 103, the solid phase is preferably handled in such a manner to provide intimate contact between the solid phase and the solution containing sulfite ions, bisulfite ions or sulfur dioxide gas for a period ranging from about 1 hour to 4 hours, for example by the use of an agitated tank reactor.

The sulfur dioxide can be introduced to the reactor as a gas in a gaseous fluid supply. Alternatively, the sulfite or bisulfite ions can be added to the reaction in solid or liquid form as the sodium metabisulfite, sodium sulfite, ammonium bisulfite or similar compounds. The optimum $SO_2$, $SO^{2-}_3$ or $HSO^{2-}_3$ dosage level will vary from one feed material to the next, and will have to be established for each application by testwork. The $SO_2$, $SO^{2-}_3$ or $HSO^{2-}_3$ dosage and consumption will generally be in the range of 5 to 20 kg $SO_2$ equivalent per ton of feed solids.

Preferably, the pH is maintained at a level ranging from 1 to 11, more preferably 7 to 11, by adding a base material, such as lime, or sodium hydroxide, or by using sulfite, bisulfite or metabisulfite salts rather than $SO_2$ gas.

If desired, residual unreacted traces of sulfur dioxide may be expelled from the material prior to cyanidation by a supplemental aeration process step as shown at 110, by exposing the material to a gaseous fluid supply of air, for a period of up to 2 hours, by the use of a second stirred tank reactor.

Although it has been found that sparging of the reactor vessel with air or oxygen during pretreatment of the gold bearing feed material with sulfur dioxide, sulfite ions or bisulfite ions is generally not beneficial, in some cases it can be beneficial, especially if carrying out the process of this invention with sulfur dioxide gas under acidic conditions. This needs to be established by testwork on a case by case basis.

As will be evident below, the benefits of the sulfur dioxide, sulfite or bisulfite pretreatment in the present invention were unexpected given the fact that other strong oxidants did not significantly affect the proportion of cyanide consumed during cyanidation.

The optimum amount and the optimum concentration of the sulfur dioxide, sulfite ions or bisulfite ions, and the pH of the reaction will vary with the nature of the ore or concentrate being processed. This may be established by carrying out some initial tests on ore samples and by selecting the most desirable conditions by adjusting such things as the sulfur dioxide, sulfite or bisulfite addition rate, the pH of the reaction and the residence time thereof, with a view to exposing the material to sulfur dioxide gas, sulfite ions or bisulfite ions in a manner to cause at least a portion of the intermediate sulfur materials either to be oxidized to soluble ions or to be rendered unreactive with cyanide, preferably a large portion of the intermediate sulfur oxidation products, most preferably, substantially all of the intermediate sulfur oxidation products.

In some cases, there may be other species in solution that affect the consumption of cyanide, such as $Fe^{2+}$. The $Fe^{2+}$ species can also conveniently be oxidized to the $Fe^{3+}$ oxidation state prior to cyanidation, and precipitated as the ferric hydroxide species, which is unreactive in cyanide solution.

While the present process has been discussed with respect to gold, it may also be applicable to the recovery of other precious metals by the cyanidation process, including silver and the platinum group metals (PGMs).

Sulfur dioxide has been used in combination with oxygen in other oxidation processes, such as the Inco process for the destruction of cyanide in gold plant tailings, which is widely practiced industrially. In the present process, the addition of oxygen or air to the reactor has been found to be neither beneficial nor harmful to the process in most cases. Air can be used therefore, if beneficial for other purposes, such as a carrier gas to transfer the sulfur dioxide gas into the reactor.

Embodiment of the present invention will be described with reference to the following examples which are presented for illustrative purposes only and are not intended to limit the scope of the invention.

EXAMPLE

A number of tests were undertaken to compare the effectiveness of the sulfur dioxide, sulfite or bisulfite oxidation process for different feed materials and for different residence times, under varying pH conditions against other known oxidants.

Three different samples were collected from two operating gold mines where they had first been subjected to the BIOX® process, the output of which was a slurry, whose solid and liquid phases were separated. The resulting filter cakes were re-pulped in fresh water to form test slurries, from which several equal sub-samples of each concentrate type were formed.

Each sample came from refractory gold pyrite/arsenopyrite concentrates that had been subjected to the BIOX® process, therefore having substantially common constituents. The results presented in Tables 1, 2 and 3 were based on testwork conducted on BIOX® concentrates from three different ore bodies. During cyanidation, cyanide reacts with gold as well as with the intermediate sulfur oxidation products. Given that the samples came from a common source, a relatively consistent consumption of cyanide would normally be expected for each sample during the course of the reactions with cyanide.

The several samples from one of the concentrates (Table 1) were exposed to varying oxidation pretreatments, with the first three exposed to common oxidants (Tests CN-1, CN-2 and CN-3) and those remaining subjected to sulfur dioxide oxidation under varying pH conditions and for varying residence times. After pretreatment, each sample was exposed to a cyanidation step by reaction with NaCN. Finally, the extraction of gold from each sample was measured.

Surprisingly, the hypochlorite ion, which is a very strong oxidant, failed to reduce cyanide consumption appreciably, as shown in CN-3, compared to air or oxygen (CN-1 and CN-2). However, there was a significant reduction in the amount of cyanide consumed from CN-1, using the air oxidant, to CN-4 which uses a mixture of sulfur dioxide gas and air as an oxidant. There was still an even more significant reduction in cyanide consumed by sample CN-5, showing a reduction of 66 percent from the consumed cyanide of sample CN-1, namely from 25.8 kg/t for sample CN-1 down to just 8.7 kg/t for sample CN-5. The gold extracted dropped from 81.9 percent for CN-1 to 77.4 percent for sample CN-4 and further still to 76.6 percent for CN-5. However, this drop is not necessarily to be expected in all cases, indeed as sample CN-7 shows, with a gold extraction of 81.9 percent.

Other tests showed that variation of the volume percent of sulfur dioxide in the sulfur dioxide/air mixture, in the range of 0.3 to 0.6 percent (Tests CN-5 and CN-8) had little effect on cyanide consumption or gold recovery, and pH variation had minimal effect in the range 7 to 11 (Tests CN-12, CN-13 and CN-14). The parameter that had the greatest effect on gold recovery and cyanide consumption was cyanide strength. The maximum gold recovery (88.8 percent) was achieved at the highest NaCN strength of 5 g/L (Test CN-9), but cyanide consumption was uneconomically high in this test.

The source of sulfur dioxide tested for pretreatment of the second concentrate (Table 2) was the compound sodium metabisulfite. This compound dissolves in aqueous solution to produce either sulfur dioxide gas (pH<2), bisulfite ions (pH2–7) or sulfite ions (pH>7) depending on the pH of the solution.

The initial cyanidation tests (CN-15, 16 and 17) were carried out without pretreatment of the BIOX® concentrate, and showed that a cyanide strength of 2.5 g/L NaCN is needed to produce maximum gold recovery. Cyanidation for 48 hours at a maintained NaCN strength of 2.5 g/L yielded 96.9% gold recovery at 19.9 kg/t NaCN consumption.

Pretreatment with sodium metabisulfite at an equivalent $SO_2$ dosage of 14 kg/t and pH 9.0 reduced the cyanide consumption by 35 percent to 12.3 kg/t, and achieved essentially the same gold recovery of 96.6 percent (Test CN-20).

Variation of the sodium metabisulfite addition from 3.5 to 28 kg/t equivalent $SO_2$ dosage had very little effect on cyanide consumption, which varied only from 10.4 to 12.3 kg/t, but had a fairly significant effect on gold recovery, which varied from 92.7% to 96.6% (Tests CN-20, 22, 23, 24). The best result was achieved at an equivalent $SO_2$ dosage of 14 kg/t.

The source of sulfur dioxide tested for treatment of the third concentrate was sodium sulfite, both on its own and in combination with oxygen gas. Leaching of this concentrate without pretreatment yielded 93.6% gold recovery in 48 hours at 1.0 g/L NaCN strength, for a cyanide consumption of 7.8 kg/t NaCN (Test CN-26). This was the best result achieved using a normal cyanidation technique without the process of this invention.

Pretreatment with sodium sulfite at an equivalent $SO_2$ dosage of 15 kg/t reduced the cyanide consumption by 36% to ~5 kg/t and resulted in an improvement in gold recovery to 96–97% (Tests CN-28, 29, 30, 31). Pretreatment at pH 11.5 (Tests CN-28, 29) produced essentially the same results as pretreatment at pH 6.5 (Tests CN-30,31), and the addition of oxygen during pretreatment (Tests CN-29, 31) was not beneficial compared to pretreatment with sodium sulfite on its own (Tests CN-28, 30).

The predominant source of cyanide consumption is the reaction of cyanide ions with intermediate sulfur oxidation products to form a new species, the thiocyanate anion. Consistent with this fact is the decrease in the amount of thiocyanate produced during cyanidation, by a factor of 2 to 3, when using the process of this invention compared to the cases where more conventional oxidants were used in tests CN-1, CN-2 and CN-3 or when there was no pretreatment (Tables 1, 2 and 3).

TABLE 1

| | OXIDATIVE PRETREATMENT | | | | | CYANIDATION | | SCN | GOLD RECOVERY | | |
| | | | | | | NaCN | NaCN | IN | | Calc | Leach |
| Test No. | Process | Dosage kg/t | $SO_2$ Vol % | pH | Time (h) | Conc g/L | Consumed kg/t | SOL'N (g/L) | Residue (g/t) | Head (g/t) | Efficiency (%) |
|---|---|---|---|---|---|---|---|---|---|---|---|
| CN1 | Air | — | — | 10.5 | 2 | 1 | 25.8 | 9.5 | 5.34 | 29.5 | 81.9 |
| CN2 | Oxygen | — | — | 10.5 | 4 | 1 | 22.6 | 7.7 | 5.71 | 27.0 | 80.8 |
| CN3 | NaOCl | 26 | — | 10.5 | 2 | 1 | 24.5 | 8.8 | 5.57 | 27.9 | 82.5 |
| CN4 | $SO_2$/Air | 7.5 | 0.6 | 9 | 3 | 1 | 17.7 | 8.1 | 7.16 | 27.9 | 77.9 |
| CN5 | $SO_2$/Air | 15 | 0.6 | 9 | 3 | 1 | 8.7 | 3.6 | 7.66 | 28.7 | 76.6 |
| CN6 | $SO_2$/Air | 30 | 0.6 | 9 | 5 | 1 | 10.8 | 4.8 | 6.97 | 27.3 | 77.6 |
| CN7 | $SO_2$/Air | 15 | 0.6 | 3 | 3 | 1 | 15.1 | 7.8 | 5.62 | 28.4 | 81.9 |
| CN8 | $SO_2$/Air | 15 | 0.3 | 9 | 6 | 1 | 10.0 | 4.3 | 7.85 | 27.8 | 76.1 |
| CN9 | Nil | — | — | — | — | 5 | 64.7 | 26.0 | 3.73 | 27.8 | 88.8 |
| CN10 | $SO_2$/Air | 15 | 0.6 | 9 | 3 | 5 | 45.2 | 24.2 | 4.57 | 29.6 | 86.0 |
| CN11 | $SO_2$/Air | 15 | 0.6 | 9 | 3 | 2 | 19.6 | 9.8 | 5.96 | 29.4 | 82.0 |
| CN15 | $SO_2$/Air | 15 | 0.6 | 9 | 3 | 1 | 8.7 | 3.6 | 7.66 | 28.7 | 76.6 |
| CN12 | $SO_2$/Air | 15 | 0.4 | 7 | 3 | 0.5 | 5.2 | 2.3 | 8.32 | 29.1 | 72.9 |
| CN13 | $SO_2$/Air | 15 | 0.4 | 9 | 3 | 0.5 | 7.2 | 3.3 | 8.48 | 28.0 | 72.0 |
| CN14 | $SO_2$/Air | 15 | 0.4 | 11 | 3 | 0.5 | 7.1 | 3.2 | 7.02 | 29.0 | 71.9 |

TABLE 2

| | OXIDATIVE PRETREATMENT | | | | | CYANIDATION | | SCN IN | GOLD RECOVERY | | |
| | | Equiv $SO_2$ | Equiv | | | NaCN | NaCN | IN | | Calc | Leach |
| Test No. | Process | Dosage kg/t | $SO_2$ Vol % | pH | Time (h) | Conc g/L | Consumed kg/t | SOL'N (g/L) | Residue (g/t) | Head (g/t) | Efficiency (%) |
|---|---|---|---|---|---|---|---|---|---|---|---|
| CN15 | — | — | — | — | — | 1.0 | 8.8 | 3.96 | 21.1 | 182 | 88.9 |
| CN16 | — | — | — | — | — | 2.5 | 19.9 | 6.62 | 5.80 | 181 | 96.9 |
| CN17 | — | — | — | — | — | 5.0 | 30.6 | 7.59 | 5.76 | 171 | 96.6 |
| CN18 | Air | — | — | 10.5 | 24 | 2.5 | 18.0 | 5.91 | 5.35 | 163 | 96.8 |
| CN19 | $Na_2S_2O_5$/Air | 14 | 0.66 | 9.0 | 3 | 1.0 | 5.0 | 2.43 | 37.0 | 171 | 78.6 |
| CN20 | $Na_2S_2O_5$/Air | 14 | 0.66 | 9.0 | 3 | 2.5 | 12.3 | 5.90 | 5.76 | 168 | 96.6 |
| CN21 | $Na_2S_2O_5$/Air | 14 | 0.66 | 9.0 | 3 | 5.0 | 20.9 | 8.42 | 5.13 | 172 | 97.0 |
| CN22 | $Na_2S_2O_5$/Air | 3.5 | 0.66 | 9.0 | 1.5 | 2.5 | 12.2 | 5.25 | 12.9 | 168 | 92.7 |
| CN23 | $Na_2S_2O_5$/Air | 7 | 0.66 | 9.0 | 2 | 2.5 | 11.6 | 4.62 | 9.13 | 170 | 94.8 |
| CN20 | $Na_2S_2O_5$/Air | 14 | 0.66 | 9.0 | 3 | 2.5 | 12.3 | 5.90 | 5.76 | 168 | 96.6 |
| CN24 | $Na_2S_2O_5$/Air | 28 | 0.66 | 9.0 | 5 | 2.5 | 10.4 | 4.25 | 9.72 | 177 | 94.6 |

TABLE 3

| Test No. | OXIDATIVE PRETREATMENT | | | | | CYANIDATION | | LEACH LIQUOR COMPOSITION | | | | GOLD RECOVERY | | |
|---|---|---|---|---|---|---|---|---|---|---|---|---|---|---|
| | Process | Equiv SO$_2$ Dosage kg/t | Equiv SO$_2$ Vol % | pH | Time (h) | NaCN Conc g/L | NaCN Consumed kg/t | SCN g/L | S$_2$O$_3$ g/L | S$_3$O$_6$ g/L | S$_4$O$_6$ g/L | Residue (g/t) | Calc Head (g/t) | Leach Efficiency (%) |
| CN25 | — | — | — | — | — | 0.5 | 3.6 | 1.56 | N/A | N/A | N/A | 29.2 | 100 | 70.8 |
| CN26 | — | — | — | — | — | 1.0 | 7.8 | 3.30 | N/A | N/A | N/A | 5.83 | 99.8 | 93.6 |
| CN27 | Na$_2$S$_2$O$_5$/Air | 14 | 0.66 | 9.0 | 3 | 1.0 | 6.1 | 2.21 | N/A | N/A | N/A | 7.18 | 97.8 | 92.7 |
| CN28 | Na$_2$SO$_3$ | 15 | | 11.5 | 4 | 1.0 | 4.8 | 1.86 | 0.96 | <0.1 | <0.01 | 3.43 | 92.9 | 96.1 |
| CN29 | Na$_2$SO$_3$/O$_2$ | 15 | | 11.5 | 4 | 1.0 | 4.7 | 1.71 | 0.82 | <0.1 | <0.01 | 2.70 | 93.1 | 96.9 |
| CN30 | Na$_2$SO$_3$ | 15 | | 6.5 | 4 | 1.0 | 4.1 | 1.38 | <0.1 | 1.57 | <0.01 | 2.74 | 90.4 | 96.7 |
| CN31 | Na$_2$SO$_3$/O$_2$ | 15 | | 6.5 | 4 | 1.0 | 5.2 | 1.80 | <0.1 | 0.60 | <0.01 | 4.57 | 86.7 | 94.6 |

A decrease in the concentration of the thiocyanate anion will have the added economic benefit of reducing the cost of tailings treatment in those countries where the presence of this species in mine effluents is controlled by environmental regulation.

What is claimed is:

1. A method for reducing cyanide consumption in mining processes to recover gold, silver or platinum group metals from a sulfur bearing ore body, comprising the steps of:
   providing an ore material containing gold, silver or platinum group metals and also containing at least one sulfur constituent selected from the group consisting of elemental sulfur and other sulfur compounds with oxidation states between a minus 2 state and a plus 6 state, and
   contacting said ore material with an aqueous medium containing sulfur dioxide gas, sulfite ions or bisulfite ions, in a manner to cause at least a portion of said constituents to be converted to species which are unreactive with cyanide and to form a solid phase containing the gold, silver or platinum group metals; and
   subjecting the solid phase to a cyanidation step to recover the gold, silver or platinum group metals therefrom.

2. A method as defined in claim 1, wherein the step of contacting includes the step of varying the concentration of sulfur dioxide gas, sulfite or bisulfite so as to maximize the conversion of the sulfur constituents being rendered unreactive with cyanide in the subjecting step.

3. A method as defined in claim 1, wherein, following the contacting step and prior to the subjecting step, the medium includes a liquid phase containing converted sulfur constituents and the solid phase, further comprising the step of separating the liquid phase from the solid phase.

4. A method as defined in claim 1 wherein the contacting step is carried out at a pH ranging from 1 to 11.

5. A method as defined in claim 4 wherein the pH ranges from 7 to 11.

6. A method as defined in claim 1 wherein the contacting step is continued for a period ranging from about 1 hour to 4 hours.

7. A method for recovering precious metals from a sulfur-bearing ore body, comprising the steps of:
   providing a precious metal-bearing material containing intermediate sulfur oxidation products;
   contacting said material with sulfur dioxide gas, sulfite ions or bisulfite ions, and
   reacting said material with cyanide to recover precious metal from said material,
   the contacting step being conducted under conditions sufficient to reduce the content of intermediate sulfur oxidation products which are reactive to cyanide, thereby reducing the consumption of cyanide in the reacting step.

8. A method as defined in claim 7, wherein the contacting step includes the step of varying the concentration of sulfur dioxide gas, sulfite ions or bisulfite ions so as to maximize the conversion of the intermediate sulfur oxidation products being rendered unreactive with cyanide in the contacting step.

9. A method as defined in claim 7, wherein, following the contacting step, the material is in a medium which includes a liquid phase containing soluble intermediate sulfur oxidation products and a solid phase containing the precious metals, further comprising the step of separating the liquid phase from the solid phase and wherein the reacting step is carried out on the solid phase.

10. A method as defined in claim 7 wherein the contacting step is carried out at a pH ranging from 1 to 11.

11. A method as defined in claim 10 wherein the pH ranges from 7 to 11.

12. A method as defined in claim 7 wherein the contacting step is continued for a period ranging from about 1 hour to 4 hours.

13. In a cyanidation process to recover precious metals from precious metals-containing sulfide materials which also contain cyanide consuming intermediate sulfur oxidation products selected from the group consisting of elemental sulfur and other sulfur compounds with sulfur oxidation states between a minus 2 state and a plus 6 state, a method of reducing cyanide consumption comprising a step for contacting the materials with an aqueous medium containing sulfur dioxide gas, sulfite ions or bisulfite ions, in a manner to convert at least a portion of said intermediate sulfur oxidation products to one or more species which are unreactive with cyanide in the cyanidation process.

14. A method as defined in claim 13 wherein the sulfur compounds are selected from the group consisting of polysulfide, trithionate and tetrathionate.

15. A method as defined in claim 13, wherein the step of contacting includes the step of varying the concentration of sulfur dioxide gas, sulfite ions or bisulfite ions so as to maximize the conversion of the intermediate sulfur oxidation products being rendered unreactive with cyanide.

16. A method as defined in claim 13, wherein, following the contacting step, the medium includes a liquid phase containing soluble intermediate sulfur oxidation products and a solid phase containing the precious metals, further comprising the step of separating the liquid phase from the solid phase.

17. A method as defined in claim 13 wherein the contacting step is carried out at a pH ranging from 1 to 11.

18. A method as defined in claim 17 wherein the pH ranges from 7 to 11.

19. A method as defined in claim 13 wherein the contacting step is continued for a period ranging from about 1 hour to 4 hours.

20. A method for recovering precious metals from a sulfur-bearing ore material, comprising the steps of:

provinding a solid phase precious metal-bearing material containing elemental sulfur;

contacting said material with a liquid phase containing sulfur dioxide gas, sulfite ions or bisulfite ions, in a manner to convert at least a portion of said elemental sulfur to thiosulfate ions in the liquid phase and to form a sulfur-depleted solid phase;

separating the thiosulfate ion-containing liquid phase from the sulfur-depleted solid phase and thereafter;

reacting the solid phase with cyanide to recover precious metal from the solid phase.

21. A method as defined in claim 20, wherein the step of contacting includes the step of varying the concentration of sulfur dioxide gas, sulfite ions or bisulfite ions so as to maximize the conversion of the intermediate sulfur oxidation products being rendered unreactive with cyanide in the contacting step.

22. A method as defined in claim 20 wherein the contacting step is carried out at a pH ranging from 1 to 11.

23. A method as defined in claim 22 wherein the pH ranges from 7 to 11.

24. A method as defined in claim 20 wherein the contacting step is continued for a period ranging from about 1 hour to 4 hours.

25. A method for reducing cyanide consumption in precious metals mining extraction processes involving a sulfur bearing ore body, comprising the steps of:

providing a precious metal bearing material including elemental sulfur; and contacting said material with an aqueous medium containing sulfur dioxide gas, sulfite ions or bisulfite ions, in a manner to cause substantially all of said elemental sulfur to be converted to sulfur species which are unreactive with cyanide in a later cyanidation step.

26. A method as defined in claim 25, wherein, following the contacting step, the medium includes a liquid phase containing the sulfur species and a solid phase containing the precious metals, further comprising the step of separating the soluble intermediate sulfur oxidation products in the liquid phase from the solid phase.

27. A method as defined in claim 25 wherein the contacting step is carried out at a pH ranging from 1 to 11.

28. A method as defined in claim 27 wherein the pH ranges from 7 to 11.

29. A method as defined in claim 25 wherein the contacting step is continued for a period ranging from about 1 hour to 4 hours.

* * * * *